Dec. 22, 1925.
A. E. CARLSON
DRILL
Filed Dec. 26, 1922
1,566,578
2 Sheets-Sheet 1
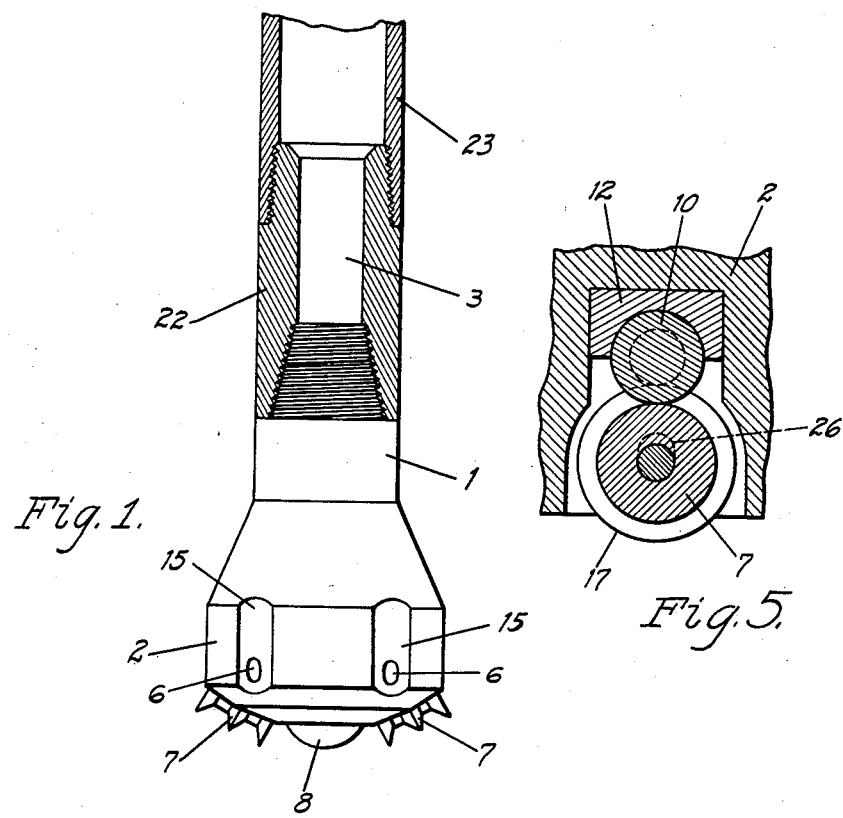
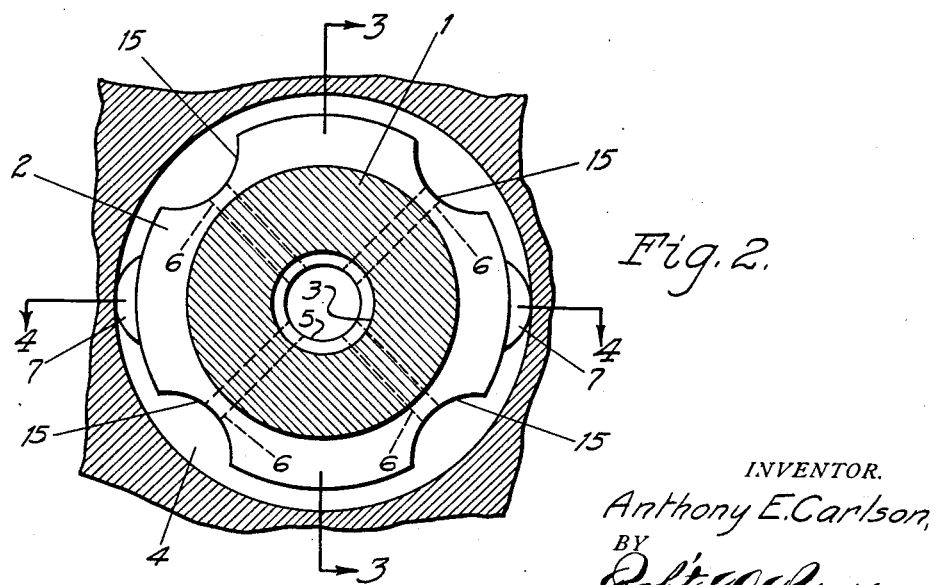
INVENTOR.
Anthony E. Carlson,
BY
Robt. W. Pearson
ATTORNEY.

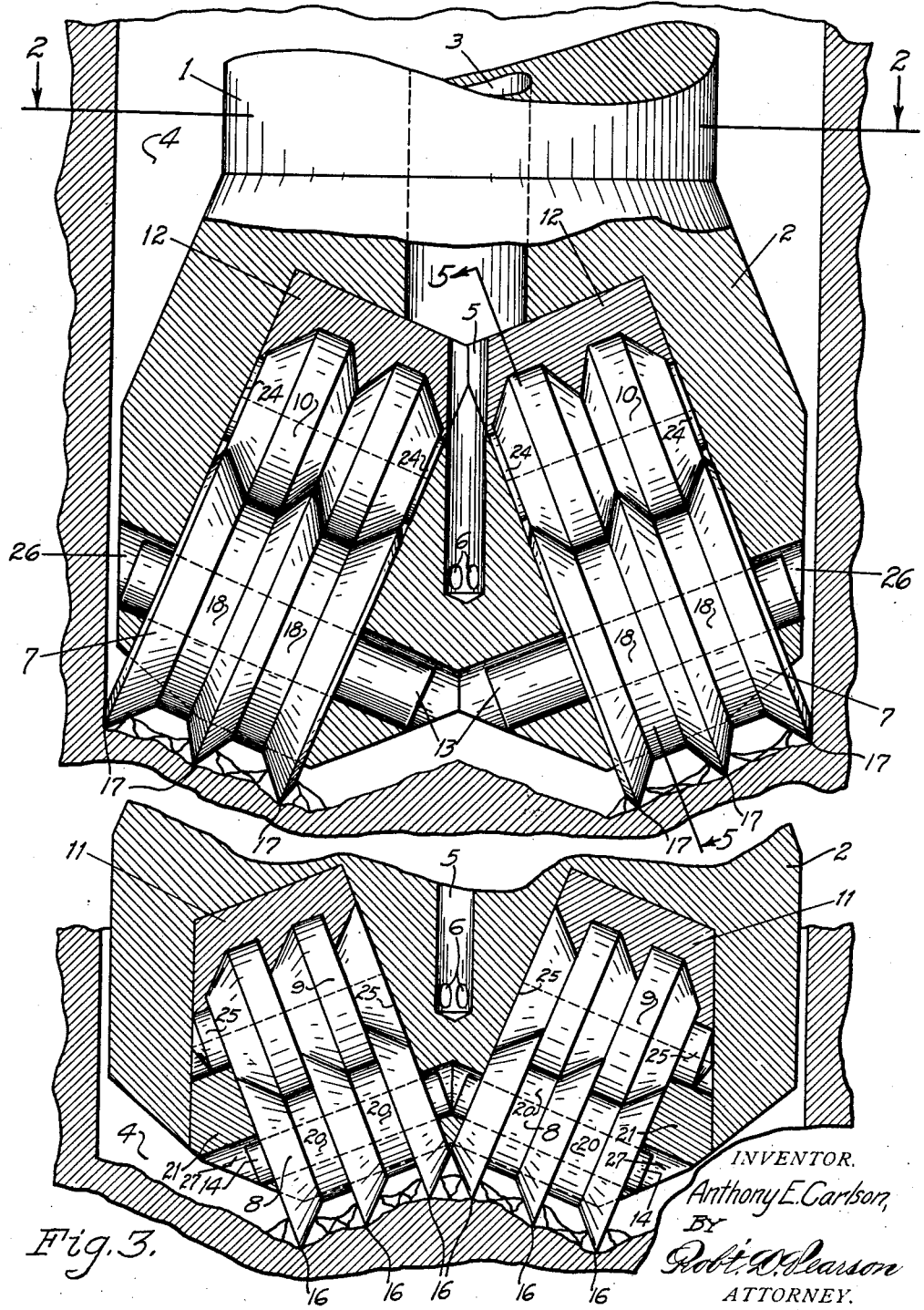

Patented Dec. 22, 1925.

1,566,578

UNITED STATES PATENT OFFICE.

ANTHONY E. CARLSON, OF LOS ANGELES, CALIFORNIA.

DRILL.

Application filed December 26, 1922. Serial No. 608,913.

*To all whom it may concern:*

Be it known that I, ANTHONY E. CARLSON, a citizen of the United States, residing at Los Angeles, in the county of Los Angeles and State of California, have invented certain new and useful Improvements in Drills, of which the following is a specification.

My invention relates to drills for boring holes through stone, glass and other hard materials, and the objects are first, to provide a rotary drill for deep-narrow wells; second, to provide a standard deep well drill stand with a cutter head and multiple edge rotary cutters therein; third, to provide a cutter-edge support and former, for the said rotary cutters; fourth, to provide a bearing for the said cutter-edge support and former.

Other objects are to provide a rotary cutter that is simple to construct, and easy to operate.

Still further objects are to provide a multiple edge drill that is easily repaired and sharpened.

Referring to the drawings:

Figure 1 illustrates a side view of the drill and stand.

Figure 2 is a sectional view on line 2—2 of Figure 4.

Figure 3 is a part sectional view on line 3—3 of Figure 2, and its bore.

Figure 4 is a part sectional view on line 4—4 of Figure 2, and its bore.

Figure 5 is a sectional view on line 5—5 of Figure 4.

Again referring to the drawings in which like characters of reference designate similar parts, the head 2 is shown in drilling positions in Figures 2, 3 and 4, within the bore 4, and the shank 1 is formed integral with the said head 2, the said shank 1 is secured to the sleeve 22, and sleeve 22 is in turn secured to the stand pipe 23, respectively.

The sets of bearings 12, rollers 10, and cutters 7, respectively, are assembled in the head 2 at angles to the longitudinal line of the said head 2 and the shank 1, with the outer end of the said assembly pointing upwardly from the central portion of the head 2 and the lower end of the said assembly pointing inwardly beyond the outer circular face of the head 2, as shown in Figure 4.

The several sets of bearings 11, rollers 9, cutters 8, and segments 21, respectively, are in turn assembled in the same head 2 at angles to the longitudinal line of the said head 2 and the shank 1, with the upper end of the said assembly pointing inwardly to the central portion of the head 2 and the lower end of the said assembly pointing outwardly towards the outer portion of the head 2, as shown in Figure 3.

The respective assembled sets of bearings 12, rollers 10, and cutters 7, and the assembled sets of bearings 11, rollers 9, cutters 8 and segments 21 are slidably and operatively arranged in the said head 2 so as to clear one another, and the edges 17 and 16 on the said cutters 7 and 8 respectively are extended into the bottom portion of the bore 4 with multiple-angle radial cutting lines, as shown in Figures 3 and 4. The cutters 7 and 8 are assembled with their axes substantially ninety degrees apart and with the outermost cutting edges 16 of cutters 8 within the circle described by the innermost cutting edges 17 of cutters 7 so that said outermost and innermost cutting edges will not overlap in the operation of the drill.

The cutters 7 and 8 are formed with projecting edges 17 and 16 respectively, on angular lines as hereinbefore described, and the surfaces 18 and 20 are formed in the respective cutters 7 and 8 between the edges 17 and 16, the shafts 13 and 14 are secured in the cutters 7 and 8 respectively, the head 2 and segments 21 are formed with slots 26 and 27 therein, and the said slots 26 and 27 operatively receive the said shafts 13 and 14 respectively, in their predetermined angles to the longitudinal line of the drill, the rollers 10 and 9 are in turn meshed operatively into the said cutters 7 and 8 and the bearings 12 and 11, respectively, on lines to correspond to the said edges 17 and 16 and the surfaces 18 and 20, respectively. The said rollers 10 and 9 are formed as hereinbefore described, and as shown in Figures 4 and 3 respectively, and the ends 24 and 25 respectively are formed on the outer-central portion of the said rollers 10 and 9 to fit operatively between the recesses in the said head 2.

The hole 3 is formed through the central portion of the shank 1 and head 2, and the hole 5 passes from the said hole 3 down to the holes 6, the said holes 6 in turn pass through the lower portion of the head 2 into the respective flutes 15, and the flutes 15 are formed in the outer portion of the said head 2, from the bottom end to the top end thereof.

To drill holes through stone and other hard materials, the operating means is first made to lower the pipe 23, shank 1 and head 2, into the bore 4, to allow the cutters 7 and 8 to roll around the center of the bottom-end portion of the said bore 4, and as the said cutters 7 and 8 revolve with the shafts 13 and 14 respectively, the rollers 9 and 10 are in turn revolved in the bearings 11 and 12 respectively. As the bearings 11 and 12, rollers 9 and 10, cutters 8 and 7 respectively, wear together after being used for a time, the shafts 14 and 13 will shift back into the slots 27 and 26 respectively, and allow the said bearings 11 and 12, rollers 9 and 10, cutters 8 and 7 respectively, to roll and bear together as hereinbefore described.

With the rolling motion of the cutters 8 and 7, and their respective edges 16 and 17 and the surfaces 20 and 18 under pressure, in mesh with corresponding adjacent surfaces on the said rollers 9 and 10 respectively, the said rollers 9 and 10 will keep the edges 16 and 17 respectively, in a sharpened condition, and the surfaces 20 and 18 in turn deliver the load from the rollers 9 and 10, to the edges 16 and 18 respectively, when drilling holes under pressure.

The inclined position of the cutters 7 when disposed from a raised outside position, to a lower inside position, permits the outside edge 17 thereof to extend beyond the outer surface of the head 2, to drill the bore 4 to a larger diameter than the said head 2, and also to assist the drilling operation through the face of the bottom-end of the bore 4, by cutting on a line made by the inclined position of the cutters 7. The inclined position of the cutters 8 when disposed from a raised center-point in the head 2, to a lower outer position, to a point joining the said line of the cutters 7, permits the outside edge 16 thereof to roll adjacent to the drilling line formed by the said inside edge 17, in their alternate order.

The materials are broken and cut from the bore 4 as hereinbefore described, and are removed therefrom in the customary manner by forcing water down through the holes 3 and 5, and thence through the several holes 6, past the flutes 15 to the bottom-end of the said bore 4, and the said materials are washed up between the head 2 and flutes 15, and past the shank 1, the sleeve 22, and pipe 23 to the top of the bore 4 for disposal thereof.

Having thus described my invention, what I claim is:

1. In a drill, a head, a pair of rotary cutters journaled in the lower end of said head with their axes inclined upwardly from the longitudinal axis of the head, said cutters being formed with spaced annular cutting edges, and a second pair of rotary cutters journaled in the lower end of said head at substantially ninety degrees to said first pair of cutters with their axes inclined downwardly from the axis of the head, said cutters being formed with spaced annular cutting edges.

2. In a drill, a head, a pair of rotary cutters journaled in the lower end of said head with their axes inclined upwardly from the longitudinal axis of the head, said cutters being formed with spaced annular cutting edges, and a second pair of rotary cutters journaled in the lower end of said head adjacent said first pair of cutters with their axes inclined downwardly from the axis of the head, said cutters being formed with spaced annular cutting edges, the outermost cutting edges of said last pair of cutters being located within the circle described by the innermost cutting edges of said first pair of cutters.

3. In a drill, a head, a rotary cutter journaled in the lower end of said head, a bearing, and a roller mounted with its upper side in a recess in the bearing and with its lower side in contact with the upper side of said cutter.

4. In a drill, a head, a rotary cutter journaled in the lower end of said head, a bearing block detachably mounted in said head and provided with a bearing recess in its lower side, and a roller fitting in said recess, against the lower side of which roller the upper side of said cutter bears.

5. In a drill, a head, a pair of rotary cutters journaled in the lower end of said head, a second pair of cutters journaled in the lower end of said head, adjacent said first pair the outermost edges of said last cutters being within the circle described by the innermost edges of said first cutters.

6. In a drill, a head, a pair of rotary cutters formed with annular spaced cutting edges, said cutters being journaled in the lower end of said head with their axes inclined downwardly from the axis of the head and with the inner cutting edges of the cutters adjacent each other at their lower sides at the axis of the head, a second pair of rotary cutters formed with spaced annular cutting edges, said latter cutters being journaled in the lower part of the head with their axes inclining upwardly from the axis of the head and with their inner cutting edges slightly outside the circle described by the outermost cutting edges of the first pair of cutters.

7. In a drill, a head, a pair of rotary cutters formed with annular spaced cutting edges, said cutters being journaled in the lower end of said head with their axes inclined downwardly from the axis of the head and with the inner cutting edges of the cutters adjacent each other at their lower sides at the axis of the head, a second pair of rotary cutters formed with spaced annular cutting edges, said latter cutters being journaled in the lower part of the head with their axes inclining upwardly from the axis of the head and with their inner cutting edges adapted to circumscribe a circle adjacent the outermost cutting edges of the first pair of cutters.

In testimony whereof I affix my signature.

ANTHONY E. CARLSON.